United States Patent
Mayor et al.

(10) Patent No.: US 12,168,913 B2
(45) Date of Patent: Dec. 17, 2024

(54) METHODS FOR TRANSPORTING SCALE REMOVAL AGENTS INTO A WELL

(71) Applicant: Baker Hughes Oilfield Operations LLC

(72) Inventors: John Mayor, Cypress, TX (US); Kelly Guilbeau Berard, Breaux Bridge, LA (US); Marty J. Usie, Youngsville, LA (US)

( * ) Notice: Subject to any disclaimer, the term of this patent is extended or adjusted under 35 U.S.C. 154(b) by 83 days.

(21) Appl. No.: 17/742,971

(22) Filed: May 12, 2022

(65) Prior Publication Data

US 2023/0366296 A1    Nov. 16, 2023

(51) Int. Cl.
E21B 37/06    (2006.01)
C09K 8/74    (2006.01)
C09K 23/18    (2022.01)

(52) U.S. Cl.
CPC ............... *E21B 37/06* (2013.01); *C09K 8/74* (2013.01); *C09K 23/18* (2022.01); *C09K 2208/30* (2013.01)

(58) Field of Classification Search
None
See application file for complete search history.

(56) References Cited

U.S. PATENT DOCUMENTS

| | | | |
|---|---|---|---|
| 7,028,775 B2 | 4/2006 | Fu et al. | |
| 7,902,124 B2 | 3/2011 | Ali et al. | |
| 9,029,299 B2 | 5/2015 | Crews et al. | |
| 9,080,043 B2 | 7/2015 | Yuan-Huffman et al. | |
| 9,157,022 B2 * | 10/2015 | Wood | C09K 8/88 |
| 9,341,052 B2 | 5/2016 | Gadberry et al. | |
| 10,308,866 B2 | 6/2019 | Li et al. | |
| 2005/0126778 A1 | 6/2005 | McElfresh et al. | |
| 2007/0111896 A1 | 5/2007 | Knox et al. | |
| 2007/0125542 A1 | 6/2007 | Wei et al. | |
| 2008/0153720 A1 * | 6/2008 | Huang | C09K 8/80 507/272 |
| 2009/0192053 A1 * | 7/2009 | Crews | C09K 8/602 507/275 |
| 2015/0007989 A1 | 1/2015 | Chong et al. | |
| 2015/0225640 A1 * | 8/2015 | Crews | C09K 8/516 507/200 |

FOREIGN PATENT DOCUMENTS

EP    1534927 B1    4/2008

OTHER PUBLICATIONS

International Search Report and Written Opinion, PCT/US2023/018848, Jul. 10, 2023.

* cited by examiner

*Primary Examiner* — John J Figueroa
(74) *Attorney, Agent, or Firm* — Baker Hughes Company

(57) ABSTRACT

A scale removal agent may effectively be introduced into a well having a formation temperature of 300° F. The scale removal agent is a component of a gelled fluid containing an amine oxide viscoelastic surfactant.

20 Claims, 1 Drawing Sheet

METHODS FOR TRANSPORTING SCALE REMOVAL AGENTS INTO A WELL

FIELD

The disclosure relates to a delivery system for introducing scale removal agents into a high-temperature well and to methods for removing scales from such wells using the delivery system. The delivery system is a viscous gel containing a high-temperature resistant viscoelastic surfactant and the scale removal agent.

BACKGROUND

Fluids produced from wells typically contain a complex mixture of components including aliphatic hydrocarbons, aromatics, hetero-atomic molecules, anionic salts, cationic salts, sulfides, acids, sands, silts and clays. The nature of these fluids combined with the severe conditions of heat, pressure, and turbulence to which they are often subjected, are contributory factors to the formation of scales. Scales are further commonly formed in produced water which contains high concentrations of alkaline earth metal cations such as calcium, strontium, iron and barium, along with anions such as carbonate, bicarbonate, sulfide sulfate. Further, scales may form from interaction of anions with the metals of brine. For instance, zinc sulfide and iron sulfide scales may form by interaction of hydrogen sulfide gas or a sulfur-containing chemical and a zinc-based brine.

Scale deposits are especially known to form near the wellbore, inside casing, tubing, pipes, the annular space between production tubing and casing, pumps, valves, heating coils as well as onto surfaces within the well including recovery equipment. The formation and deposition of scales is known to decrease permeability of the reservoir penetrated by the well, reduce well productivity, cause restrictions of fluid flow (and often complete blockage) in piping, reduce perforation tunnel diameter, reduce production tubing diameter and plug the flow path within the reservoir. In addition to reducing fluid flow and heat transfer, over time large scale deposits can promote corrosion and bacterial growth. In acute situations, the lifetime of production equipment is shortened and the decrease in production rate attributable to scale deposits may force a halt in hydrocarbon recovery from the well. Further, the presence of scales in the annulus may make it difficult or impossible to remove the tubing for servicing.

Removal of scales often requires expensive well interventions involving mechanical devices such as scrapers, reamers, wire lines and coil tubing. Such remedial techniques are only useful if the devices can effectively reach the target location.

Other known methods for scale removal are premised on the delivery of chemical treatment agents to affected areas. Such methods often require hydrocarbon protection to be put into abeyance. For example, in downhole squeezing a slug of scale removal agent in a fluid is injected into the annulus as a pre-flush, squeeze or over flush fluid before the well can be returned to normal function. This technique further requires large volumes of treatment and flush fluid and is often limited to water-soluble scale removers.

U.S. Pat. Nos. 7,491,682; 7,598,209; 7,493,955; 9,010,430; 9,029,300; and 9,656,237 disclose methods of delivering water-soluble scale removing treatment agents into the well wherein the treatment agent is a component of a composite. The treatment agent may be released from the composite into the environs. Such methods are, however, typically ineffective in the treatment of wells having high bottomhole temperature.

Conventional methods of delivering well treatment agents into the well are further hampered when the scale treatment agent is oil-soluble. Since they are insoluble in water, such inhibitors are typically introduced into the well in an oil-based slug or slurry. The highly viscous nature of oil-soluble treatment agents restricts the amount of the treatment agent that can be delivered in a slug or slurry. In addition, such methods are typically not effective in the treatment of high-temperature wells.

The need for alternative methods for delivering scale removal treatment agents has sharpened in today's market as operators continuously drill significantly deeper into wells to access hydrocarbon bearing formations. Typically, the temperature in such reservoirs exceed 300° F. Thus, it is essential for the delivery system to be capable of carrying and releasing scale removal agents into targeted areas in wells having a temperature in excess of 300° F.

SUMMARY

In an embodiment, the disclosure relates to a delivery system for introducing scale removal agents into a well having a bottomhole temperature in excess of 300° F., the delivery system being a gelled fluid of a temperature resistant viscoelastic surfactant and the scale removal agent. The viscoelastic surfactant is an amine oxide, an amidoamine oxide or an alkylamidoquaternary amine. The delivery system provides a method for delivering a scale removal agent to a targeted area of a well or to a subterranean formation penetrated by a well at an elevated bottomhole temperature greater than or equal to 300° F. Upon breakage of the bonds of the viscoelastic surfactant, the scale removal agent may be released from the gelled fluid.

In another embodiment, a method of transporting a scale removal agent into a well is provided wherein the scale removal agent is incorporated into a gelled fluid; the gelled fluid having a viscoelastic surfactant. The viscoelastic surfactant is an amine oxide, an amidoamine oxide or an alkylamidoquaternary amine. The gelled fluid is stable up to a temperature of at least 300° F.

In another embodiment, a method of removing scale deposits from a well is provided wherein the well has a bottomhole temperature of at least 300° F. In this method, a gelled fluid is pumped into a well containing a scale removal agent and a viscoelastic surfactant of an amine oxide, an amidoamine oxide or an alkylamidoquaternary amine. Upon reaching the targeted area within the well, the viscoelastic surfactant starts to degrade. As the viscoelastic surfactant degrades, the scale removal agent is released from the gelled fluid. Scale deposits are dissolvable in the liquid phase resulting from the degradation of the viscoelastic surfactant. The scales may then be removed from the well in the liquid.

In another embodiment, the rate of release of a scale removal in a high temperature well is controlled by introducing into the scale removal agent as a component of the gelled fluid. The gelled fluid contains the scale removal agent and a viscoelastic surfactant of an amine oxide, amidoamine oxide or an alkylamidoquaternary amine. The gelled fluid delays release of the scale removal agent. The scale removal agent is released into the targeted area once the viscoelastic surfactant starts to degrade. The scale removal agent is not released into targeted areas of the well until the downhole temperature in the well exceeds 300° F.

The viscoelastic fluid of the gelled fluid may be an amidoamine oxide of the structural formula (II):

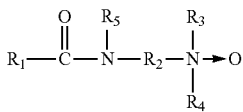
(II)

or an alkylamido quaternary amine of the structural formula (III):

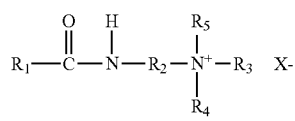
(III)

where:
- $R_1$ is an aliphatic group of from about 8 to about 30 carbon atoms;
- $R_2$ is a divalent alkylene group of from 2 to about 6 carbon atoms;
- $R_3$ and $R_4$ are the same or different and are selected from alkyl or hydroxyalkyl groups of from 1 to about 6 carbon atoms that may optionally be alkoxylated or together with the nitrogen atom form a heterocyclic ring of up to 6 members;
- $R_5$ is hydrogen, $R_3$ or $R_4$; and
- X is a counterion.

In another embodiment, the viscoelastic fluid of the gelled fluid is an alkylamidoquaternary amine of the formula (IV):

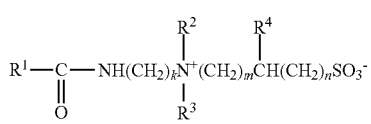
(IV)

wherein:
- $R_1$ is a saturated or unsaturated, hydrocarbon group of from about 17 to about 29 carbon atoms;
- $R_2$ and $R_3$ are independently selected from a straight chain or branched, alkyl or hydroxyalkyl group of from 1 to about 6 carbon atoms;
- $R_4$ is selected from —H, —OH, alkyl and hydroxyalkyl groups of from 1 to about 4 carbon atoms;
- k is an integer of from about 2 to about 20;
- m is an integer from about 1 to about 20; and
- n is an integer of from 0 to about 20.

DETAILED DESCRIPTION

Figure 1:
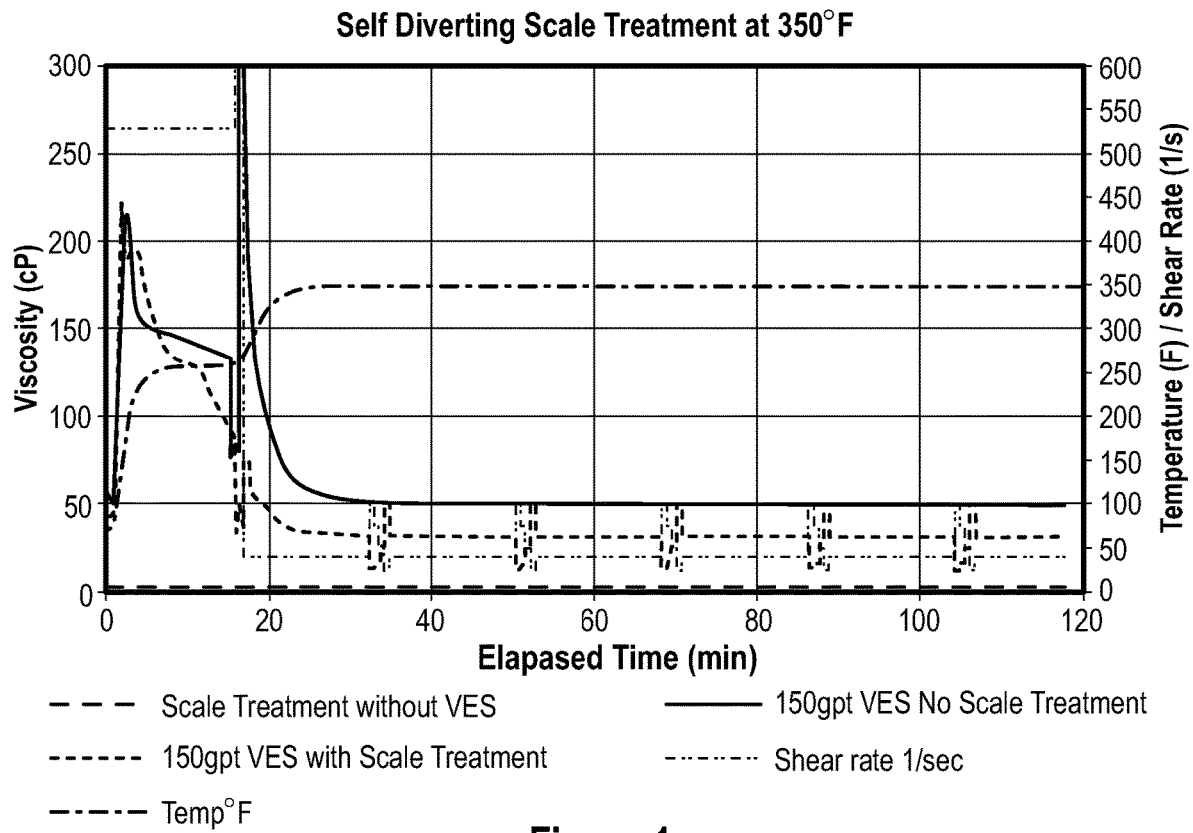
FIG. 1 illustrates stability of the gelled fluid disclosed herein when diverted into well at 350° F.

Characteristics and advantages of the present disclosure and additional features and benefits will be readily apparent to those skilled in the art upon consideration of the following detailed description of exemplary embodiments of the present disclosure and referring to the accompanying figure. It should be understood that the description herein, being of exemplary embodiments, are not intended to limit the claims. On the contrary, the intention is to cover all modifications, equivalents and alternatives falling within the spirit and scope of the claims. Changes may be made to the particular embodiments and details disclosed herein without departing from such spirit and scope.

Certain terms are used herein and in the appended claims to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . ."

Further, reference herein and in the appended claims to components and aspects in a singular tense does not necessarily limit the present disclosure or appended claims to only one such component or aspect, but should be interpreted generally to mean one or more, as may be suitable and desirable in each particular instance. Thus, use of the terms "a" and "an" and "the" are to be construed to cover both the singular and the plural, unless otherwise indicated herein or clearly contradicted by context. The suffix "(s)" as used herein is intended to include both the singular and the plural of the term that it modifies, thereby including at least one of that term (e.g., the colorant(s) includes at least one colorants).

All ranges disclosed herein are inclusive of the endpoints. Unless stated otherwise, any range of values within the endpoints is encompassed. For example, where the endpoints of a range are stated to be from 1 to 10, any range of values, such as from 2 to 6 or from 3 to 5 will be defined by the range. The suffix "(s)" as used herein is intended to include both the singular and the plural of the term that it modifies, thereby including at least one of that term. All references are incorporated herein by reference.

All references are incorporated herein by reference.

The delivery system is a gelled fluid of a viscoelastic surfactant and scale removal agent. As used herein, the phrase "scale removal agent" shall refer to a material component capable of removing scales formed within a well at elevated temperature. Such materials may be water-soluble or oil-soluble. The scale removal agent may be introduced into a targeted area of the well or subterranean formation penetrated by the well, a flow conduit or piping within the well as a component of the gelled fluid.

The scale removal agent may remain inactive within the gelled fluid until it is released into the environs. Release of the scale removal agent from the gelled fluid occurs upon degradation of the viscoelastic surfactant. Typically, the scale removal agent is not released from the viscous gel until the viscoelastic surfactant until the onset of degradation. Over time the gelled fluid containing the scale removal agent breaks down to a more liquid, thinner, or less viscous mass, allowing the scale removal agent to disperse within produced fluids. Scales may be dissolved or be suspended in formation fluids as well as produced fluids as they are transported out of the well.

The release of the scale removal agent from the gelled fluid may extend over a period of time. The release and rate of release of the scale removal agent from the gelled fluid is dependent on the breakdown of the viscoelastic surfactant and the time duration for the viscoelastic fluid to completely degrade. At full degradation of the viscoelastic surfactant, the scale removal agent is completely released. The rate of release of the scale removal agent from the gelled fluid increases as the temperature downhole increases due to thermal thinning. (However, this rate of release is much slower than seen in traditional prior art methods.) In light of the slower rate of release, the scale removal agent penetrates into deeper targeted areas within the well. In some cases, complete release of all of the scale removal agent in the gelled fluid may be in excess of 3 days after the start of degradation of the viscoelastic surfactant. Slow and gradual degradation of the viscoelastic surfactant provides a means for the gelled fluid to be diverted deeper into the well over time or into areas not typically reached. Further, the gelled fluid is able to divert and be placed deeper into the formation due to the viscous nature of the viscoelastic surfactant.

The viscoelastic surfactant referenced herein refers to an organic surfactant which degrades at a bottomhole temperature in excess of 300° F. It provides viscoelasticity by forming elongated, often cylindrical, micelles which may be described as worm-like, thread-like, or rod-like micelles. Such elongated micelles exhibit rheological properties at temperatures in excess of 300° F. While they may exhibit shear-thinning behavior, they remain stable when subjected to high shear.

In light of the elevated temperature stability of the viscoelastic surfactants, the gelled fluid is stable at bottomhole temperatures in excess of 300° F. Such stability has not been observed using traditional biopolymers, such as xanthans. The viscoelastic surfactant in the gelled fluid does not thermally degrade until the temperature in the formation reaches 300° F. or more. In most cases, the degradation temperature within the well is greater than or equal to 310° F., in other cases greater than or equal to 325° F., in other cases greater than or equal to 350° F. and in other cases greater than or equal to 375° F. and in some cases as high as 450° F. and in other cases as high as 500° F. or higher. As such, release of the scale removal agent and the rate of release of the scale removal agent from the viscous gel begins to occur upon thermal thinning of the gelled fluid. Complete degradation of the gelled fluid occurs as the bottomhole temperature in the well increases, formation fluids are diluted and the micellular structure of the viscoelastic surfactant is inverted. In some cases, a high temperature breaker may be used to assist degradation of the gelled fluid at elevated temperatures.

In an embodiment, the gelled fluid may be characterized as a self-diverting scale removal system since, in light of its resistance to thermal degradation at elevated temperatures, the fluid first pumped may temporarily plug more permeable zones within the formation or those zones closer to the wellbore while subsequently pumped fluid will be diverted into less permeable zones farther from the wellbore.

In an embodiment, the viscoelastic surfactant can be selected from amine oxide surfactants including amidoamine oxide surfactants and may be a mixture of two or more thereof. Suitable viscoelastic surfactants include an amine or amidoamine oxide of structural formula (I):

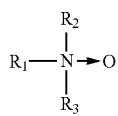

(I)

where:
  $R_1$ is an alkyl, alkenyl, cycloalkyl, alkylarylalkyl, alkylamido or alkylamidoalkyl and has from about 8 to about 30 carbon atoms and may be straight or branched chained and saturated or unsaturated. Examples of long chain alkyl groups include, but not limited to, octadecenyl (oleyl), octadecyl (stearyl), docosenoic (erucyl) and the derivatives of tallow, coco, soy and rapeseed oils;
  $R_2$ and $R_3$ are, independently, hydrogen or an aliphatic group having from 1 to about 30 carbon atoms, preferably from about 1 to about 20 carbon atoms, more preferably from about 1 to about 10 carbon atoms, and most preferably from about 1 to about 6 carbon atoms. Representative aliphatic groups include alkyl, alkenyl, cycloalkyl, alkylaryl, hydroxyalkyl, carboxyalkyl and hydroxyalkyl-polyoxyalkylene. The aliphatic group may be straight or branched chained and saturated or unsaturated.

In an embodiment, the viscoelastic surfactant is an amidoamine oxide, such as of the structural formula (II):

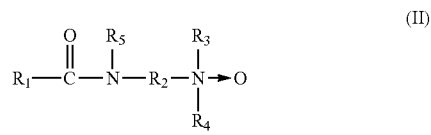

(II)

or an alkylamido quaternary amine, such as of the structural formula (III):

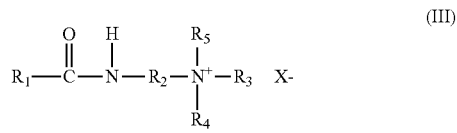

(III)

where:
  $R_1$ is a straight or branched chained and saturated or unsaturated aliphatic group of from about 8 to about 30 carbon atoms, preferably from about 14 to about 22 carbon atoms. More preferably, $R_1$ is a fatty aliphatic derived from natural fats and oils having an iodine value of from about 1 to about 140, preferably from about 30 to about 90, and more preferably from 40 to about 70. $R_1$ may be restricted to a single chain length or may be of mixed chain length such as those groups derived from natural fats and oils or petroleum stocks. Preferred are tallow alkyl, hardened tallow alkyl, rapeseed alkyl, hardened rapeseed alkyl, tall oil alkyl, hardened tall oil alkyl, coco alkyl, oleyl, or soya alkyl;
  $R_2$ is a straight or branched-chained, substituted or unsubstituted, divalent alkylene group of from 2 to about 6 carbon atoms, preferably, of 2 to 4 carbon atoms and more preferably of 3 carbon atoms;
  $R_3$ and $R_4$ are the same or different, straight or branched-chain, substituted or unsubstituted, saturated or unsaturated and are selected from alkyl or hydroxyalkyl groups of from 1 to about 6 carbon atoms that may optionally be alkoxylated and are preferably hydroxyethyl or methyl. Alternatively, $R_3$ and $R_4$ together with the nitrogen atom to which these groups are bonded form a heterocyclic ring of up to 6 members;

$R_5$ is hydrogen, $R_3$ or $R_4$, preferably a $C_1$-$C_4$ alkyl or hydroxyalkyl group; and X is an acceptable counterion including halides, oxo ions of phosphorus, sulfur or chloride, organic anions including chlorides, bromides, iodides, oxides of phosphorous, hypochlorides, phosphates, phosphates, oxides of sulfur, sulfates, sulfites, sulfonates, phosphates, acetates, carboxylates, chlorates, perchlorates, salicylates, phthalates, lactates, maleates, glycinates, citrates, citric acid, lactic acid, salicylic acid, phthalic acid, benzoic acid, naphthoic acid, amino acids, and the like.

Examples of amidoamine oxide viscoelastic surfactants include, but are not limited to, tallow amidoalkylamine oxides including tallowalkylamidopropyldimethylamine oxide, hardened tallow amidoalkylamine oxides, rapeseed amidoalkylamine oxide, hardened rapeseed amidoalkylamine oxide, tall oil amidoalkylamine oxide, hardened amidoalkylamine oxide, coco amidoalkylamine oxide, stearyl amidoalkylamine oxide, oleyl amidoalkylamine oxide, soya amidoalkylamine oxide, and mixtures thereof.

Preferred amidoamine oxides include a tallow amidopropylamine oxide, tallow amidopropyl dimethylamine oxide, hydrogenated tallow amidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$-$C_{22}$ saturated or unsaturated fatty acid amidopropyl dimethylamine oxides, and mixtures thereof.

In an embodiment, the viscoelastic surfactant is of the formula (III) where $R_1$ is preferably derived from a fatty aliphatic derived from natural fats or oils having an iodine value of from about 1 to about 140, preferably from about 30 to about 90, and more preferably from 40 to about 70; $R_1$ may be restricted to a single chain length or may be of mixed chain length such as those groups derived from natural fats and oils or petroleum stocks. Preferred are tallowalkyl, hardened tallow alkyl, rapeseed alkyl, hardened rapeseed alkyl, erucic alkyl, tall oil alkyl, hardened tall oil alkyl, coco alkyl, oleyl, or soya alkyl. $R_2$ is a straight chain or branched, substituted or unsubstituted divalent alkylene group of from 2 to about 6 carbon atoms, preferably, of 2 to 4 carbon atoms and more preferably of 3 carbon atoms. $R_3$, $R_4$ and $R_5$ are the same or different and are selected from alkyl, aryl or hydroxyalkyl groups of from 1 to about 8 carbon atoms and are preferably hydroxyethyl or methyl. Alternatively, $R_3$, $R_4$ and $R_5$ together with the nitrogen atom to which these groups are bonded form a heterocyclic ring of up to 6. $R_5$ is hydrogen or a $C_1$-$C_4$ alkyl or hydroxyalkyl group. Specific examples of alkyl amido quaternary amines include erucyl amidopropyl trimethyl ammonium chloride, isostearylamidopropylmorpholine, dimethylalkylglycerolammonium chloride, etc.

Other viscoelastic surfactants are those of the formula (IV):

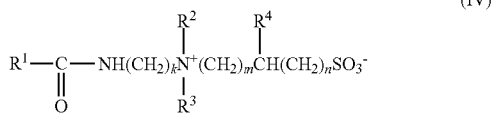

(IV)

wherein:

$R^1$ is a saturated or unsaturated, hydrocarbon group of from about 17 to about 29 carbon atoms;

$R^2$ and $R^3$ are independently selected from a straight chain or branched, alkyl or hydroxyalkyl group of from 1 to about 6 carbon atoms;

$R^4$ is selected from —H, —OH, alkyl and hydroxyalkyl groups of from 1 to about 4 carbon atoms;

k is an integer of from about 2 to about 20;

m is an integer from about 1 to about 20; and n is an integer of from 0 to about 20.

In an embodiment $R^1$ of (IV) is from about 18 to about 21 carbon atoms. In another embodiment, $R^1$ is a fatty aliphatic derived from natural fats or oils having an iodine value of from about 1 to about 140, typically from about 30 to about 90, and more typically from 40 to about 70. $R^1$ may be restricted to a single chain length or may be of mixed chain length such as those groups derived from natural fats and oils or petroleum stocks. Examples are tallow alkyl, hardened tallow alkyl, rapeseed alkyl, hardened rapeseed alkyl, tall oil alkyl, hardened tall oil alkyl, coco alkyl, oleyl, erucyl or soya alkyl.

In an embodiment, the number of carbons in $R^2$ and $R^3$ may be from about 1 to about 4 and still another embodiment the number of carbons in $R^2$ and $R^3$ may be from about 1 to about 3 carbon atoms.

In embodiment, $R^4$ may be selected independently from ethyl, —OH, hydroxyethyl and methyl.

In another embodiment, k is preferably an integer of from about 2 to about 12, and in other instances is an integer from about 2 to about 6, and in yet another embodiment, k is an integer from about 2 to about 4.

In another embodiment, m is an integer from about 1 to about 12, and in another embodiment from about 1 to about 6 and in another embodiment from about 1 to about 3.

In another embodiment, n is an integer from 0 to about 12, and in another embodiment from 0 to about 6, and in still another embodiment 0 or 1.

Exemplary of such viscoelastic surfactants are erucamidopropyl hydroxypropyl sulfobetaine, erucamido hydroxysultaine, erucamidopropyl hydroxyethyl sulfobetaine, erucamidopropyl hydroxymethyl sulfobetaine and mixtures thereof.

The scale removal agent in the viscous gel may be a water-soluble or oil-soluble scale removal agent. Suitable scale removal agents include those which are efficacious in the removal of scales of calcium, barium, magnesium salts and the like, including barium sulfate, calcium sulfate, and calcium carbonate scales as well as inorganic scales, such as zinc sulfide, iron sulfide, etc.

Exemplary scale removal agents are strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof. Phosphonate/phosphonic acid type scale removal agents are often preferred in light of their effectiveness to control scales at relatively low concentration. Polymeric scale removal agents, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale removal agents. Sodium salts are preferred. Further useful, especially for brines, are chelating agents, including diethylenetriaminepentamethylene phosphonic acid and ethylenediaminetetra acetic acid.

Further, the scale removal agent may be a copolymer comprising an acrylamide unit and a quaternary ammonium salt group, and optionally an acrylate and/or nitrogen heterocyclic monomer. Such copolymers include those of an acrylamide unit and a diallyldimethylammonium salt and, optionally, an acrylic acid or a salt thereof. For instance, the copolymer may comprise an acrylamide unit and a unit of the formula:

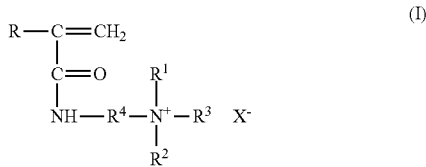

wherein R is methyl or hydrogen; $R^4$ is a $C_1$ to $C_6$ alkyl group, optionally substituted with halogen, hydroxyl or an alkoxy (preferably methoxy and ethoxy) groups, X is halogen; and $R^1$, $R^2$ and $R^3$ are independently selected from the group consisting of alkyl and alkoxy groups, preferably methyl, ethyl, methoxy and ethoxy.

Further preferred as scale removal agents are inorganic and organic strong acids such as hydrochloric acid, acetic acid and formic acid. Caustic scale removal agents may be employed to remove sulfate scales and may include sodium hydroxide, chelants such as EDTA, glucoheptanate, and urea.

Suitable scale removal agents are anionic scale removal agents. Preferred scale removal agents include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof. Phosphonate/phosphonic acid type scale removal agents are often preferred in light of their effectiveness to control scales at relatively low concentration. Polymeric scale removal agents, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale removal agents. Sodium salts are preferred. Further useful are chelating agents, including diethylenetriaminepentamethylene phosphonic acid and ethylenediaminetetra acetic acid.

In an embodiment, the treatment agent may be a halite mineral scale removal agent such as those based on nitrilotriacid.

Further, the scale removal agent may be an amino trimethylene phosphonic acid (ATMP), 1-hydroxy ethylidene-1, 1-diphosphonic acid (HEDP), 2-phosphonobutane-1,2,4-(tricarboxylic acid (PBTC), 2-hydroxyethyl-amino-bis (methylenephosphonic acid (HEAMBP), ethylene diamine tetrakis (methylene phosphonic acid) (EDTMP), tetramethylenediamine-tetrakis-(methylene phosphonic acid) (TDTMP), hexamethylene diamine tetrakis (methylene phosphonic acid) (HDTMP), 2-hydroxy phosphonoacetic acid (HPAA), diethylene triamine penta(methylene phosphonic acid) (DTPMP), bis (hexamethylene triamine penta (methylene phosphonic acid) (BHPMP), polyamino polyether methylene phosphonate (PAPEMP) or a salt thereof; phosphino-polycarboxylate (PPCA), polyacrylate (PAA), polymaleic acid (PMA), an acrylic copolymer, sulfonate polyacrylate co-polymer, polyvinyl sulfonate, carboxymethyl inulin, polyaspartates and mixtures thereof.

Further useful, especially for brines, are chelating agents, including diethylenetriaminepentamethylene phosphonic acid and ethylenediaminetetra-acetic acid.

Suitable oil-soluble scale removal agents include sulfonated acrylate copolymers added to organic solvents, blends of phosphonates (like ATMP, DTPMP etc.) with tertiary amines, like 2-ethyl hexyl amine etc.

In an embodiment, the amount of scale removal agent in the gelled fluid may be from about 0.5 to 40 volume percent of the gelled fluid. Typically, the weight ratio of scale removal agent to the viscoelastic surfactant in the gelled fluid is between from about 0.5:99.5 to about 99.5:0.5. More typically, the amount of scale removal agent in the gelled fluid is from about 0.05 to about 25% by volume of the gelled fluid.

The viscosity of the gelled fluid is such that it is pumpable at the wellsite. The gelled fluid may be combined in a batch process performed at the wellsite using mixing vessels or may be batched mixed away from the wellsite and transported to the wellsite using methods known in the art.

In an embodiment, the gelled fluid may be introduced neat, in a carrier fluid or as a component of a treatment fluid.

In an embodiment, the gelled fluid may be introduced into the well as a component of a carrier fluid such as aqueous fluids like distilled water, fresh water, salt water and a high density brine. Brines are often preferred and the typical density of the brine may be between from about 8.4 ppg (pounds per gallon) to about 20 ppg. Depending on the desired density of the aqueous fluid, a brine can be a one salt solution (e.g. NaCl, NaBr, KCl, $CaCl_2$), $CaBr_2$, $ZnBr_2$ or formate salt in water), a two salt solution (e.g. $CaCl_2$/$CaBr_2$ or $ZnBr_2$/$CaBr_2$), or a three salt solution (e.g. $ZnBr_2$/$CaBr_2$/$CaCl_2$)). The composition of the brine determines the fluid properties of the gel such as pH, density, etc.

In other embodiments, the gelled fluid may be carried into the formation, tubular or conduit in a liquid hydrocarbon (aliphatic or aromatic), steam or gas, such as nitrogen or carbon dioxide.

The gelled fluid may further be injected into the formation in liquefied gas, such as liquefied natural gas or liquefied petroleum gas as well as in foams, such as carbon dioxide, nitrogen and carbon dioxide/nitrogen.

Other non-aqueous media include acetic acid and acetates (e.g., 2-ethoxyethyl acetate), ketones (e.g., acetone, butanone, pentanone, hexanone), a $C_1$-$C_4$ alkanol or preferably, aqueous glycol mixtures (e.g., mixtures of ethylene glycol and water). Further, ethylene glycol and its derivatives, such as the monomethyl ether, the monoethyl ether, the monopropyl ether, the monobutyl ether, and the monohexyl ether; diethylene glycol and its derivatives, such as the monomethyl ether, the monoethyl ether, the monopropyl ether, the monobutyl ether, and the monohexyl ether; propylene glycol and its derivatives, including the monomethyl ether, the monopropyl ether, and the monobutyl ether; and dipropylene glycol and its derivatives, such as the monomethyl ether, the monopropyl ether, and the monobutyl ether may be used alone or in combination with water. Other suitable types of materials useful as the liquid medium include lactones such as butyrolactone, and alcohols such as butanol, diacetone alcohol (4-hydroxy-4-methyl-2-pentanone) 2,6-dimethyl-4-heptanol, hexanol, isopropanol, 2-ethylhexanol, and 1-pentanol.

The gelled fluid containing the viscoelastic surfactant and scale removal agent may also be introduced into the well as a component of a well treatment fluid, such as a stimulation (e.g., fracturing or acidizing) fluid, completion fluid, etc. In an embodiment, the gelled fluid is introduced into the well after the well has been stimulated.

In some cases, it may be desirable to break the viscosity and reduce elasticity of the gelled fluid in order for fluids to flow back from the well. In such cases, post flushes, as well as pre-flushes may be used to assist breaking of the gelled fluid. In an exemplary embodiment, the post flush, or pre-flush, may consist of mutual solvents, hydrocarbons or alcohols. In an embodiment, internal breakers may be used to assist in the decomposition of the gelled fluid. Such breakers may be introduced to the gelled fluid in a fluid or a microemulsion. Exemplary breakers include oils, such as mineral oil as well as unsaturated fatty acids like fish oil, as well as acids and metal containing breakers. Further encapsulated breakers as well as oxidative breakers may be used.

The gelled fluid may be combined with carrier fluid or other treatment fluid in a batch process performed at the wellsite or may be batched mixed away from the wellsite and transported to the wellsite. In a preferred embodiment, the carrier or treatment fluid is prepared on the fly using continuous mixing methods at the wellsite, such as those employing concomitantly introduced component process streams.

The reservoir may be a gas well, oil well, water well, geothermal well, etc. In light of the temperature resistance of the gelled fluid and the gelled fluid not degrading until high temperatures are reached, the gelled fluid may be pumped deeper and further away from the wellbore than seen in more conventional scale removal treatments. As such, production zones farther away from the near wellbore are able to be unblocked by the scale removal action of the gelled fluid.

Generally, the gelled fluids described herein may be used to treat any type of high temperature well having scale deposits including high pressure and low pressure wells.

In an embodiment, the gelled viscoelastic fluid is used to remove scales from coal formations and can also be used in the removal of scales from shale, carbonate formations and sandstone formations as well.

In an embodiment, the gelled fluid is used to remove scales from low pressure wells. An example of low pressure wells suitable for using the gelled fluid are those wells having an internal pressure of between about 1 to about 100 psi, such as coal bed methane wells. Such wells may or may not produce water.

In addition to removal of scales within a well or in the subterranean formation, the gelled fluid may be used to treat a flow conduit extending from a well or extending to a well as well as a vessel used in the production of oil or gas.

EXAMPLES

The following examples are illustrative of some of the embodiments of the present disclosure. Other embodiments within the scope of the claims herein will be apparent to one skilled in the art from consideration of the description set forth herein. It is intended that the specification, together with the examples, be considered exemplary only, with the scope and spirit of the disclosure being indicated by the claims which follow.

All percentages set forth in the Examples are given in terms of weight units except as may otherwise be indicated.

Example 1. An aqueous fluid was prepared by first calculating the amount of each additive required to mix a desired amount of self-diverting pill. The amounts were recorded. For a 200 ml, sample, 107.6 mls fresh water was transfer to a 400 to 500 ml mixing container and placed under a standard Overhead Stirrer. The mixture was stirred at 400 to 600 rpm without entraining any air. About 30 mls of erucamidopropyl hydroxypropylsultaine (EPHPS) as viscoelastic surfactant was mixed for 30 seconds while adjusting speed to approximately 600 revolutions per minute (rpms) to prevent foaming. Approximately 15 g KCl was then added along with 1 ml of 45% potassium hydroxide (as scale removal agent) and 55 ml of an iron control additive (Ferrotrol 128L, commercially available from Baker Hughes). The mixture was stirred for an additional 2 minutes while adjusting the rpm to a vortex without entraining air.

A portion of the prepared sample was taken and placed in high pressure high temperature rheometer to assess the fluids stability. This testing mimics being pumped from surface to treatment area. This is critical that the fluid maintain certain viscosity requirements throughout this testing.

The results in FIG. 1 indicate that the combination of the 150 gpt VES with the scale removal agent maintained comparable results to an equivalent fluid without the scale removal agent. This shows compatibility in terms of viscosity stability of the fluid, assuring effective diversion will be achieved. This also establishes the test fluid will have similar enhanced penetration properties into the formation compared to a traditional method of pumping scale treatment without the viscoelastic fluid followed by "pills" of viscous fluid to create the diversion.

Figure 2:
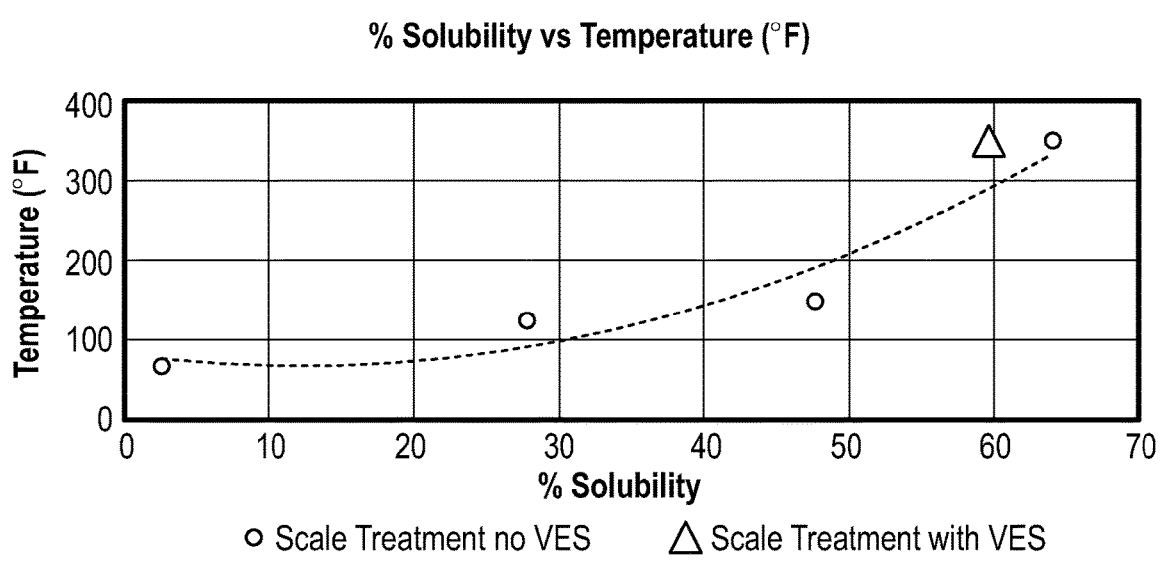
FIG. 2 illustrates the lack of negative effects of the solubility effectiveness using the disclosed gelled fluid.

Table 1 below shows the solubility results of a gelled fluid over 24 hours without the scale removal agent in the presence of barite scales at varying temperatures and illustrates overall solubility of the gelled fluid is not negatively affected by gelation of the scale removal agent. In contrast, Table 2 below and FIG. 2 show the solubility results of a gelled fluid with the viscoelastic fluid over 24 hours in the presence of barite scales at 350° F. and illustrates the effectiveness of solubility of the gelled fluid is not significantly affected when using the scale removal treatment agent with the viscoelastic surfactant.

TABLE 1

| Temp, ° F. | Sol. % |
|---|---|
| 68 | 2.62 |
| 125 | 27.76 |
| 150 | 47.62 |
| 350 | 64 |

TABLE 2

| Amt. VES in Gelled Fluid, gpt | Sol. % |
|---|---|
| 150 | 59.6 |
| 125 | 58.4 |

What is claimed is:
1. A method of transporting a scale removal agent into a well having deposits of scale, the method comprising:
(a) pumping a gelled fluid comprising a viscoelastic surfactant and the scale removal agent into the well wherein the viscoelastic surfactant is stable up to a temperature of at least 300° F. and further wherein the viscoelastic surfactant is an alkylamidoquaternary amine of the structural formula (I):

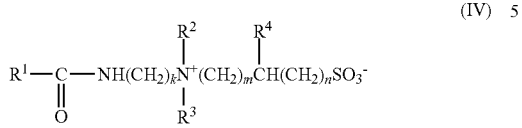
(IV)

wherein:
R$^1$ is a saturated or unsaturated, hydrocarbon group of from about 17 to about 29 carbon atoms;
R$^2$ and R$^3$ are independently selected from a straight chain or branched, alkyl or hydroxyalkyl group of from 1 to about 6 carbon atoms;
R$^4$ is selected from —H, —OH, alkyl and hydroxyalkyl groups of from 1 to about 4 carbon atoms;
k is an integer of from about 2 to about 20;
m is an integer from about 1 to about 20; and
n is an integer of from 0 to about 20;
(b) releasing the gelled fluid into the well at a bottomhole temperature in excess of 300° F.

2. The method of claim 1, wherein at least one of R$_2$ and R$_3$ is an alkyl, alkenyl, cycloalkyl, alkylaryl, hydroxyalkyl, carboxyalkyl or hydroxyalkyl-polyoxyalkylene group.

3. The method of claim 1, wherein R$_1$ is a fatty aliphatic derived from a natural fat or oil.

4. The method of claim 3, wherein R$^1$ is tallow alkyl, hardened tallow alkyl, rapeseed alkyl, hardened rapeseed alkyl, tall oil alkyl, hardened tall oil alkyl, coco alkyl, oleyl, or soya alkyl.

5. The method of claim 1, wherein the bottomhole temperature of the well is greater than or equal to 325° F.

6. The method of claim 1, wherein the amount of scale removal agent in the gelled fluid is from about 0.5 to 40 volume percent of the gelled fluid.

7. The method of claim 1, wherein the viscoelastic surfactant is selected from the group consisting of erucamidopropyl hydroxypropyl sulfobetaine, erucamido hydroxysultaine, erucamidopropyl hydroxyethyl sulfobetaine, erucamidopropyl hydroxymethyl sulfobetaine and mixtures thereof.

8. The method of claim 7, wherein the viscoelastic surfactant is erucamidopropyl hydroxypropylsultaine.

9. The method of claim 1, wherein the scale removal agent is released from the gelled fluid at a controlled rate into the well.

10. The method of claim 1, wherein the gelled fluid is carried into the well in a liquid hydrocarbon, steam, gas or foam.

11. The method of claim 1, wherein the gelled fluid is carried into the well in a liquefied gas.

12. The method of claim 1, wherein the gelled fluid is a component of a stimulation fluid or completion fluid.

13. The method of claim 1, wherein the gelled fluid is introduced into the well after the well has been stimulated.

14. A method of transporting a scale removal agent into a well having deposits of scale, the method comprising:
(a) preparing a gelled fluid comprising a viscoelastic surfactant and the scale removal agent wherein the viscoelastic surfactant is stable up to a temperature of at least 300° F. and further wherein the viscoelastic surfactant is an alkylamidoquaternary amine of the structural formula (I):

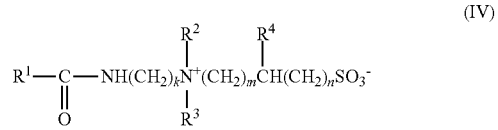
(IV)

wherein:
R$^1$ is a saturated or unsaturated, hydrocarbon group of from about 17 to about 29 carbon atoms;
R$^2$ and R$^3$ are independently selected from a straight chain or branched, alkyl or hydroxyalkyl group of from 1 to about 6 carbon atoms;
R$^4$ is selected from —H, —OH, alkyl and hydroxyalkyl groups of from 1 to about 4 carbon atoms;
k is an integer of from about 2 to about 20;
m is an integer from about 1 to about 20; and
n is an integer of from 0 to about 20;
(b) pumping into the well the gelled fluid, wherein the scale removal agent is released from the gelled fluid at a bottomhole temperature in excess of 300° F.

15. The method of claim 14, wherein the scale removal agent is released from the gelled fluid at a controlled rate.

16. The method of claim 14, wherein the viscoelastic surfactant is stable up to a temperature of at least 325° F. and further wherein the gelled fluid is released into the well at a bottomhole temperature in excess of 325° F.

17. The method of claim 16, wherein the viscoelastic surfactant is stable up to a temperature of at least 350° F. and further wherein the gelled fluid is released into the well at a bottomhole temperature in excess of 350° F.

18. The method of claim 14, wherein R1 is from about 18 to about 21 carbon atoms or is a tallow alkyl, hardened tallow alkyl, rapeseed alkyl, hardened rapeseed alkyl, tall oil alkyl, hardened tall oil alkyl, coco alkyl, oleyl, erucyl or soya alkyl.

19. A method of transporting a scale removal agent into a well having deposits of scale, the method comprising:
(a) pumping a gelled fluid comprising a viscoelastic surfactant and the scale removal agent into the well wherein the viscoelastic surfactant is stable up to a temperature of at least 300° F. and selected from the group consisting of erucamidopropyl hydroxypropyl sulfobetaine, erucamido hydroxysultaine, erucamidopropyl hydroxyethyl sulfobetaine, erucamidopropyl hydroxymethyl sulfobetaine and mixtures thereof;
(b) releasing the scale removal agent from the gelled fluid at a controlled rated into the well at a bottomhole temperature in excess of 300° F.

20. The method of claim 19, wherein the viscoelastic surfactant is stable up to a temperature of at least 325° F. and further wherein the gelled fluid is released into the well at a bottomhole temperature in excess of 325° F.

* * * * *